United States Patent Office 3,208,946
Patented Sept. 28, 1965

3,208,946
LUBRICANTS AND ADDITIVES THEREFOR
William S. Anderson and Richard D. Mullineaux, Oakland, Calif., assignors to Shell Oil Company, New York, N.Y., a corporation of Delaware
No Drawing. Filed June 7, 1961, Ser. No. 115,288
5 Claims. (Cl. 252—59)

This invention relates to improved thermoplastics, mineral oil lubricants, fuels, etc., containing a new and novel non-ash forming hydrocarbon polymer additive, and a process of preparing such polymers.

It is well known, too, in the art that certain olefinic polymers such as polyisobutylenes, polystrenes, copolymers of isobutylene and naphthalene, copolymers of butenes and long chain alpha-olefins such as octene-1 or octadecene-1, are useful as thermoplastics or pour point depressants and viscosity index improvers for mineral oils as well as many other uses. However, polymers of this type are readily attacked by atmospheric oxygen thus rendering them brittle, thermally and mechanically unstable particularly when used in lubricants subject to high shear rates or as thermoplastics. This apparent inherent instability of this class of polymers is the cause, when present in lubricants, of viscosity loss and other undesirable side reactions which occur in oils containing such additives. This is particularly aggravating when the base oil contains other additives such as detergents, extreme pressure additives such as organic metal salts, nitrogen-containing detergent polymers, organic phosphorus-containing compounds and the like, which tend to interact with the unstable components of the olefinic polymers mentioned above and thus causing sludging, wear and corrosion.

An object of the present invention is to provide an oil-soluble hydrocarbon copolymer which is mechanically stable under extreme shear rate conditions. A particular object of the present invention is to provide an oil-soluble hydrocarbon copolymer which is resistant to oxidation and is mechanically stable and which reduces the slope of the oil viscosity vs. temperature curve. Another object of the present invention is to provide a process for forming a novel oxidation resistant thermoplastic. Another object of the present invention is to provide a process for forming a novel oxidatively, mechanically and thermally stable oil-soluble hydrocarbon copolymer oil additive. Other objects in accordance with the invention will be apparent hereinafter.

It has now been discovered that an excellent oxidatively, mechanically and thermally stable thermoplastic resin or oil additive capable of improving the lubricating properties, e.g., viscosity index of mineral oils can be provided by a particular copolymer of ethylene and alpha-alkyl styrene, e.g., alpha $C_{1-4}$ alkyl styrene such as alpha-methyl styrene, of high molecular weight, namely in the range of 10,000 to 800,000, preferably between 25,000 and 500,000 prepared in the presence of a novel polymerization catalyst.

By a particular copolymer of ethylene and alpha-alkyl styrene, e.g., alpha-methylstyrene is meant one prepared under restricted conditions of monomer ratio, solvent, catalyst and reaction temperature as will be hereinbelow described. It is essential that this be clearly understood since the prior art, such as U.S. Patents 2,621,171, 2,658,058 or 2,507,338 relate to polymerization of alpha-methylstyrene in order to make resinous polymers from which various articles of manufacture can be made but these polymers lack desired plasticity and lubricity of polymers of the present invention. Ethylene/alpha-alkyl styrene, e.g., alpha-methylstyrene copolymers of the present invention are entirely different in properties from these materials, being thermally, mechanically and oxidatively stable, and at appropriate monomer ratios are capable of imparting a number of desired properties such as improved viscosity index to mineral oils.

In essence the copolymer of ethylene and alpha-alkyl styrene, e.g., alpha-methylstyrene or alpha-ethylstyrene of the present invention is produced by polymerizing a mixture containing from 20% to 99% of ethylene with 80% to 1% (mol) of alpha-alkyl styrene in the presence of an organolithium catalyst and a suitable solvent such as inert hydrocarbons, oxygen-containing compounds, e.g., tetrahydrofurans, ethers, dioxane, glycol ethers, mixtures of inert hydrocarbons with the above oxygen-containing compounds, etc., at between −50° C. and 40° C., preferably between −30° C. and 30° C.

In the preferred embodiment the mole percent of ethylene should be 5–80% in order to obtain a final product having excellent mechanical and thermal stability. Since the reaction rate of the alpha-alkylstyrene, e.g., alpha-methylstyrene, is somewhat faster than that of ethylene the starting and final monomer ratios are different. Therefore it is preferred to control the starting monomer ratio as indicated above so that the mole percent of alpha-methylstyrene in the final copolymer is between 20 and 90%.

Suitable liquid solvents may be hydrocarbons or certain oxygen-containing compounds such as aromatics, alkanes, cycloalkanes or commercially available mixtures such as butanes, n-pentanes, n-hexane, n-heptane, n-octane, isooctane, n-decane, dodecane, cyclohexane, dimethylcyclohexane, decalin, benzene, dimethyl ether, diethyl ether, dioxane, diethyl ether of diethylene glycol, tetrahydrofuran, diphenylene oxide, etc. Preferred are the oxygen-containing solvents such as tetrahydrofuran or diethyl ether or dioxane or mixtures of these solvents or mixtures of the hydrocarbons such as benzene with the oxygen-containing solvents since such solvents aid in the reaction both as to reaction speed and yield of desired end product.

The catalyst is an organo lithium such as alkyl lithium compounds, e.g., ethyl, or normal or branched butyl, octyl lithium or mixtures thereof. Catalysts of this type in conjunction with the solvents of the above-mentioned types, e.g., tetrahydrofuran or a mixture of tetrahydrofuran and benzene when used to copolymerize monomer mixtures of the present invention result in a copolymer which may be used as a thermoplastic, as a lubricant per se or as an oil additive. However, using other types of catalysts such as the Friedel-Crafts catalysts or Ziegler type catalysts or alkali metal catalysts, e.g., sodium or mixtures thereof with or without the presence of the above-mentioned solvents results in a different end product from the one made by the process of the present invention and such products are not suitable for use as lubricants or as oil additives because of their insolubility in oil products and their lack of desired oil properties.

The following examples are illustrative of the present invention.

EXAMPLE A.—COPOLYMERIZATION OF ETHYLENE AND ALPHA-METHYLSTYRENE

A 300 ml. stainless steel autoclave with magnetically driven agitator was charged with 30 ml. dry heptane, 20 ml. dry tetrahydrofuran and 7.0 ml. butyl lithium (0.6 molar in heptane.) The autoclave was purged with nitrogen, then with ethylene. Ethylene was added until the pressure in the autoclave reached 325 p.s.i.g.; the ethylene valve was then closed. A solution of 40 ml. n-heptane and 10 ml. alpha-methylstyrene was then pumped into the autoclave over a period of two hours. Reactor temperature 18–21° C. During addition of alpha-methylstyrene solution the ethylene pressure dropped to 265 p.s.i.g. Ethylene pressure was then raised to 340 p.s.i.g. and the mixture was agitated for 19 hours at 16–22° C. Finally, ethylene was vented, 5 ml. methanol was added to destroy the butyl lithium and the polymer solutions were evaporated at 75°/1 mm. The residue weighed 12.6 grams. It was dissolved in benzene, filtered, reprecipitated twice in methanol and vacuum dried. The clear gum remaining weighed 10.0 grams. Infrared showed both ethylene and alpha-methylstyrene were incorporated in the polymer. U.V. analysis indicated the composition to be 67.5% M ethylene, 32.5% M alpha-methylstyrene. Molecular weight (light-scattering in cyclohexane) was 7100. Percent C=89.6, percent H=10.4. Theoretical for the 67.5% M ethylene, 32.5% M alpha-methylstyrene given above is percent C=89.7, percent H=10.3.

Following the above procedure other copolymers of the present invention were prepared as shown in Table I.

*Table I*

| Example [1] | Reaction Temperature | Reaction Pressure | Copolymer Composition, Mol Percent of Components | | Intrinsic Viscosity in Toluene, 25° C. |
| --- | --- | --- | --- | --- | --- |
| | | | Alpha-methylstyrene | Ethylene | |
| B | 20 | 300 p.s.i. | 33 | 57 | 0.2 |
| C | 2 | 200 p.s.i. | 39 | 61 | 0.1 |
| D | −10 | 1 atms. | 66 | 34 | 0.1 |
| E | −20 | 1 atms. | 73 | 27 | 0.6 |
| F | −10 | 1 atms. | 70 | 30 | 0.2 |
| G | 20 | 12,000 p.s.i.g. | 20 | 80 | 0.8 |

[1] B and C solvent=tetrahydrofuran, catalyst=butyl lithium; D and E solvent=mixture of benzene and tetrahydrofuran, catalyst=butyl lithium; F solvent=diethylether, catalyst=octyl lithium; G solvent=tetrahydrofuran+heptane, catalyst=butyl lithium.

When desired, additional improvements with respect to oxidation stability and scuffing inhibition can be imparted to the oil compositions containing the copolymers of this invention by incorporating small amounts (0.01–2%, preferably 0.1%–1%) of phenolic antioxidants such as alkylphenols, e.g., 2,6-ditertbutyl-4-methylphenol or p,p'-methylene bisphenols such as 4,4'-methylene bis(2,6-ditertbutyl phenol) or arylamines such as phenyl-alpha-naphthylamine, dialkyl sulfides and mixtures thereof, e.g., dibenzyl disulfide, didodecyl sulfide. Anti-scuffing agents include organic phosphites, phosphates, phosphonates and their thio-derivatives, such as $C_{3-18}$ alkyl phosphites, or phosphonates, e.g., di- and tributyl, octyl, lauryl, stearyl, cyclohexyl, benzyl, cresyl, phenyl, phosphites or phosphates, as well as their thio-derivatives, $P_2S_5$-terpene reaction products e.g., $P_2S_5$-pine oil reaction product and alkali metal salts thereof such as a potassium salt of a $P_2S_5$-terpene reaction product, phosphonates such as dibutyl methanephosphonate, dibutyl trichloromethanephosphonate, dibutyl monochloromethanephosphonate, dibutyl chlorobenzenephosphonate, and the like. The full esters of pentavalent phosphorus acids such as triphenyl, tricresyl, trilauryl and tristearyl ortho-phosphates or potassium salt of $P_2S_5$-terpene reaction product are preferred.

The polymeric additives of this invention improve various mineral oil products by the incorporation of a minor amount (0.01% to 5%, preferably 0.1% to 3% by weight) of the additive. Thus, they may be used to improve transformer oils, turbine oils, hydraulic fluids, mineral lubricating oils, industrial oils and the like. Suitably such lubricating oils range from SAE 5W viscosity grade to SAE 140 grade and are derived from paraffinic, naphthenic or asphaltic base crudes. Representative oils are refined high viscosity index mineral oils having a viscosity of 100° F. of 100 to 250 SUS. A typical mineral lubricating oil (X) of this type had the following properties:

| | |
| --- | --- |
| Gr. ° API, 60/60° F. | 32 |
| Flash, ° F. | 370 |
| Viscosity index (Dean and Davis) | 93 |
| Viscosity, SUS at 100° F. | 103 |

The following non-ash compositions are representative of this aspect of the invention:

Composition A:
  Example A copolymer _____ percent wt__ 2
  Mineral lubricating oil (X), balance.
Composition B:
  Example B copolymer _____ percent wt__ 2
  Mineral lubricating oil (X), balance.
Composition C:
  Example C copolymer _____ percent wt__ 2
  Mineral lubricating oil (X), balance.
Composition D:
  Example D copolymer _____ percent wt__ 2
  Mineral lubricating oil (X), balance.
Composition E:
  Example G copolymer _____ percent wt__ 2
  Mineral lubricating oil (X), balance.
Composition F:
  Example G copolymer _____ percent wt__ 3
  4,4'-methylene bis(2,6-ditertbutylphenol) _____ percent wt__ 1
  Mineral lubricating oil (aviation oil 1100 grade), balance.
Composition G:
  Example G copolymer _____ percent wt__ 5
  4'4'-methylene bis(2,6-ditertbutylphenol) _____ percent wt__ 0.5
  Tricresyl phosphate _____ percent wt__ 0.8
  Mineral lubricating oil (X), balance.
Composition H:
  Example G copolymer _____ percent wt__ 3
  4,4'-methylene bis(2,6-ditertbutylphenol) _____ percent wt__ 5
  Didodecyl sulfide _____ percent wt__ 2
  Mineral lubricating oil (SAE 30), balance.

A shortcoming of thermoplastics made from poly-alpha-methylstyrene homopolymer is their thermal instability. At the temperatures required for molding or extruding, or in fact at any temperature greater than 61° C., poly alpha-methylstyrene decomposes to the monomer. By copolymerizing alpha-methylstyrene with ethylene this decomposition is retarded making it possible to mold or extrude objects at higher temperatures and therefore at higher rates than are possible when using poly alpha-methylstyrene.

Thus a drawback of polymers prepared for use as plastics (for example, those prepared according to U.S. 2,621,171; 2,658,058 and 2,507,338) is their brittleness. Copolymerization of ethylene with alpha-methylstyrene prepared by the methods described in the present application removes this deficiency. For example, a test piece of poly alpha-methylstyrene ¼" x ¼" x 1½" breaks easily when dropped on a hard surface from a height of two feet. A copolymer test piece of the present invention containing 60% M ethylene and 40% M alpha-methylstyrene is a tough, flexible solid which does not break even when thrown against a hard surface. Thermogravimetric data demonstrating the superior thermal stability of ethylene-alpha-methylstyrene copolymers over poly-alpha-methylstyrene are shown in Table II below.

Table II

|  | 5% wt. loss, °C. | 10% wt. loss, °C. | 15% wt. loss, °C. |
|---|---|---|---|
| Poly-alpha-methylstyrene | 215 | 325 | 340 |
| Example C copolymer | 370 | 393 | 398 |
| Example A copolymer | 393 | 410 | 415 |
| Example B copolymer | 371 | 385 | 395 |

Polymers heated under nitrogen, 25 °C./minute.

The mechanical stability of compositions of the present invention as well as other compositions noted below was determined by subjecting the test compositions to ultrasonic degradation in a 400 watt Acoustica Associates DR–400A oscillator and AT–2000 water-cooled magnetostriction transducer. The transducer was fitted to the bottom of a one-quart stainless steel tank and oil solutions were placed directly in contact with the steel transducer surface. The oscillator output consists of a 25±1 kc. signal pulsed at 120 pulses per second. Peak power is 1600 watts; average power 400 watts. Output current for all experiments was arbitrarily adjusted to 1.8 amperes RF (near the point of resonance of the loaded bath + transducer) by varying the inductance in the oscillator tank circuit. The power actually transmitted to the oil solution is 120 watts average and 480 watts on peak. Area of the transducer radiating surface was 387 cm.$^2$; the calculated average intensity was 0.31 watt/cm.$^2$.

Compositions A–G were 5 to 10 times more resistant to degradation when tested under the above condition than Composition X [mineral oil (X) + 2% copolymer of ethylene and octene-1 (50/50)]; Composition Y [mineral oil (X) + 2% polyhexene-1]; Composition Z [mineral oil (X) + 2% polylauryl methacrylate].

Lubricating compositions of this invention are particularly applicable for high speed use as in aviation engines, automotive engines, truck engines, industrial equipment as well as equipment such as hydraulic systems for brakes, elevators, mining machinery, and airplane control systems.

We claim as our invention:

1. A mineral oil composition comprising a major amount of mineral oil and from 0.01% to 5% by weight of an oil-soluble copolymer of ethylene and alpha-methylstyrene obtained by reacting between —50° C. and 40° C. the monomers in the ratio of 40–99 mol percent ethylene and 60–1 mol percent alpha-methylstyrene in an inert liquid solvent selected from the group consisting of tetrahydrofuran and benzene and a butyl lithium catalyst, said copolymer having a molecular weight in the range of from 10,000 to 800,000.

2. A mineral oil composition comprising a major amount of mineral oil and from 0.01% to 5% by weight of an oil-soluble copolymer of ethylene and alpha-methylstyrene obtained by reacting between —50° C. and 40° C. the monomers in the ratio of 40–99 mol percent ethylene and 60–1 mol percent alpha-methylstyrene in the presence of an inert liquid solvent selected from the group consisting of tetrahydrofuran and benzene and a butyl lithium catalyst, said copolymer having a molecular weight in the range of from 25,000 to 500,000.

3. A mineral oil composition comprising a major amount of mineral oil and from 0.01% to 5% of an oil-soluble copolymer of ethylene and alpha-methylstyrene obtained by reacting between —30° C. and 30° C. the monomers in the ratio of 40–60 mol percent ethylene and 60–40 mol percent alpha-methylstyrene in the presence of tetrahydrofuran solven and butyl lithium, said copolymer having a molecular weight in the range of from 25,000 to 500,000.

4. A mineral oil composition comprising a major amount of mineral oil and from 0.01% to 5% by weight of an oil-soluble copolymer of ethylene and alpha-methylstyrene obtained by reacting between —30° C. and 30° C. the monomers in the ratio of about 60 mol percent ethylene and about 40 mol percent alpha-methylstyrene in the presence of tetrahydrofuran solvent and butyl lithium catalyst, said copolymer having a molecular weight in the range of from 25,000 to 500,000.

5. A mineral oil composition comprising a major amount of mineral oil and from 0.1% to 3% by weight of an oil-soluble copolymer of ethylene and alpha-methylstyrene obtained by reacting between —30° C. and 30° C. the monomer in the ratio of about 60 mol percent ethylene and about 40 mol percent alpha-methylstyrene in the presence of a mixture of tetrahydrofuran and benzene solvent and butyl lithium catalyst, said copolymer having a molecular weight in the range of from 25,000 to 500,000.

References Cited by the Examiner

UNITED STATES PATENTS

| 2,572,558 | 10/51 | Butler | 252—59 |
| 2,614,080 | 10/52 | Welch | 252—59 |
| 2,638,465 | 5/53 | Amos et al. | 260—88.2 |
| 2,638,466 | 5/53 | Amos et al. | 260—88.2 |
| 2,656,340 | 10/53 | Sparks | 260—88.2 |
| 2,686,759 | 8/54 | Giammaria | 252—59 |
| 2,932,633 | 4/60 | Juveland et al. | 260—2 X |
| 2,982,730 | 5/61 | Barry | 252—59 |

OTHER REFERENCES

Condensed Chemical Dictionary, 5th Ed., Reinhold Publ. Co., page 1078.

DANIEL E. WYMAN, *Primary Examiner.*

JULIUS GREENWALD, *Examiner.*